United States Patent
Dausch

Patent Number: 6,071,591
Date of Patent: Jun. 6, 2000

[54] METHOD FOR MAKING A MOTOR VEHICLE DASHBOARD WITH BUILT-IN AIR DUCTS, AND RESULTING DASHBOARD

[75] Inventor: Uwe Dausch, Le Mesnil St. Denis, France

[73] Assignee: Valeo Climatisation, La Verriere, France

[21] Appl. No.: 08/973,008

[22] PCT Filed: Mar. 25, 1997

[86] PCT No.: PCT/FR97/00527

§ 371 Date: Nov. 25, 1997

§ 102(e) Date: Nov. 25, 1997

[87] PCT Pub. No.: WO97/36730

PCT Pub. Date: Oct. 9, 1997

[30] Foreign Application Priority Data

Mar. 29, 1996 [FR] France .................................. 96 04008

[51] Int. Cl.⁷ ........................... B29C 33/50; B29C 44/12; B60H 1/24
[52] U.S. Cl. ......................... 428/132; 264/45.2; 264/46.7; 264/278; 264/313; 264/317; 428/134; 428/314.4; 428/317.9; 454/143; 454/162
[58] Field of Search ........................ 264/45.2, 46.4–46.7, 264/278, 313, 314, 317; 249/62; 425/389, DIG. 12; 428/132, 134, 317.9, 314.4; 454/143, 156, 162

[56] References Cited

U.S. PATENT DOCUMENTS

| | | |
|---|---|---|
| 3,651,180 | 3/1972 | Glueckert . |
| 3,692,892 | 9/1972 | Lemelson . |
| 4,624,874 | 11/1986 | Schutze ...................................... 428/36 |
| 4,898,764 | 2/1990 | Kurihara et al. . |
| 5,045,251 | 9/1991 | Johnson ................................. 264/40.1 |
| 5,314,653 | 5/1994 | Haralambopoulos ................... 264/301 |

FOREIGN PATENT DOCUMENTS

91/15701 10/1991 WIPO .

OTHER PUBLICATIONS

Patent Abstracts of Japan vol. 012, No. 182 (M–702), May 27, 1988 & JP 62 292421 A (Honda Motor Co Ltd), Dec. 19, 1987.

*Primary Examiner*—Blaine Copenheaver
*Attorney, Agent, or Firm*—Morgan & Finnegan, L.L.P.

[57] ABSTRACT

A motor vehicle dashboard including a body made of injection-molded plastic form, and at least one air duct integrally molded with the dashboard body. The air duct is produced by means of an at least partially absorbable removable insert, particularly an inflatable balloon.

22 Claims, 2 Drawing Sheets

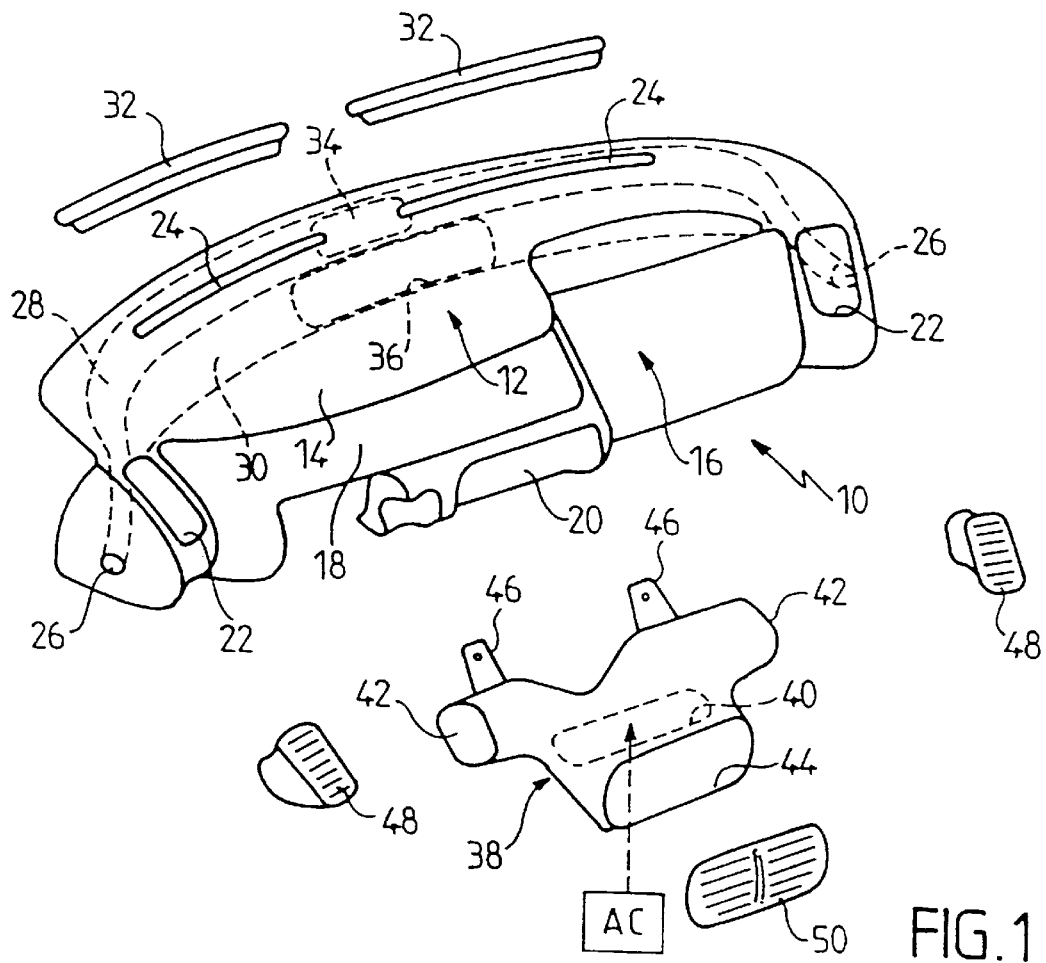
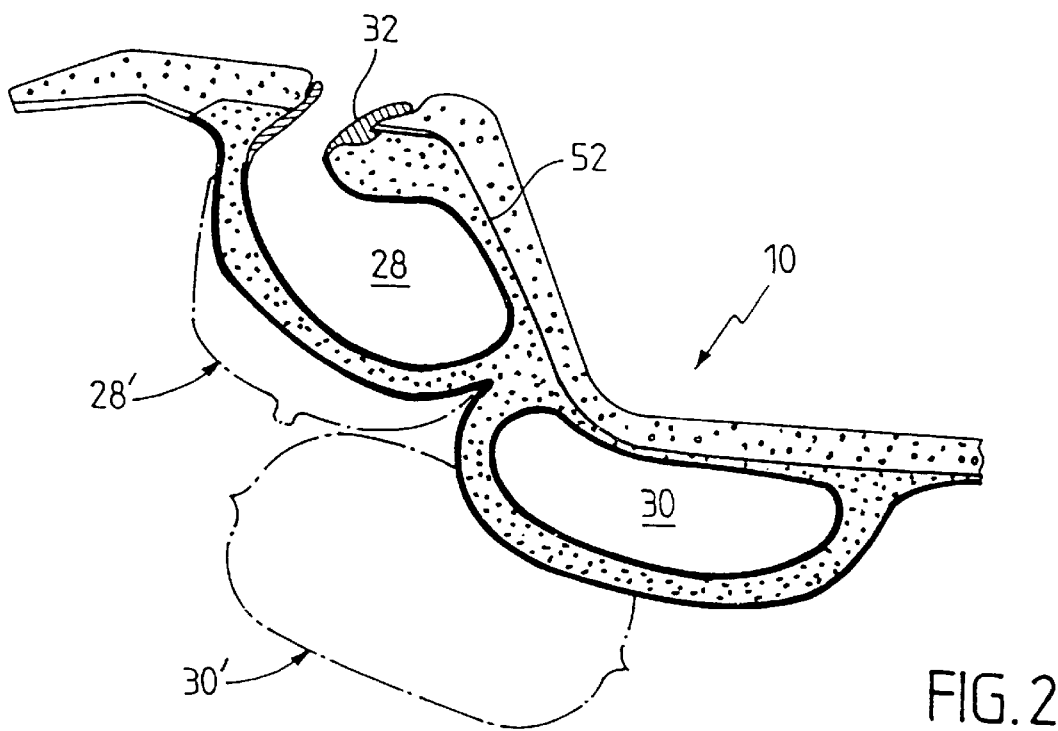

METHOD FOR MAKING A MOTOR VEHICLE DASHBOARD WITH BUILT-IN AIR DUCTS, AND RESULTING DASHBOARD

FIELD OF THE INVENTION

This invention relates to a method of making a fascia panel for a motor vehicle, in which at least one air duct is incorporated, and to the fascia panel thereby obtained.

BACKGROUND OF THE INVENTION

A motor vehicle fascia panel commonly contains at least one duct for air distribution, which is arranged to be supplied with a stream of processed air drawn from a heating and ventilating, and/or air conditioning, apparatus, and to deliver this processed air towards outlet ports which are open in selected locations in the cabin of the vehicle.

These air outlets normally include deicing vents for deicing and/or demisting the windscreen of the vehicle, and, where appropriate, side windows of the vehicle. The vents also include ventilators which are disposed on a front part of the fascia panel, and which consist of side ventilators and at least one central ventilator.

Most fascia panels contain a set of ducts, which are generally made of plastics material and which are interposed between the heating and ventilating, and/or air conditioning, apparatus and the various outlet vents.

The deicing and/or demisting vents are generally fed through ducts made of plastics material which are fixed under the armature of the fascia panel, and which are connected to a diffuser, usually again of plastics material, which is also fixed under the armature of the fascia panel, being adapted to be connected to the outlet of the heating and ventilating and/or air conditioning apparatus.

Similarly, the ventilators are generally fed through further ducts of plastics material, which are assembled mechanically and fixed under the armature of the fascia panel, being connected to a further diffuser.

Thus, the diffusion of air in such fascia panels of known types necessitates the provision of a large number of ducts and connections interposed between the heating and ventilating, and/or air conditioning, apparatus and the various air outlet vents. This gives rise to a number of drawbacks, namely: possible leaks due to imperfect connections, air noise (due to vibrations of the walls of the tubes), heat losses, aerodynamic losses, a proliferation of components, the need to provide a considerable amount of space within the fascia panel, a long and complicated fitting process, and a consequent high production cost.

It is also known, from the publication DE-3 818 666, to provide a fascia panel in which an air distribution duct is incorporated. This duct is made in the form of a single component which is applied to the fascia panel. Such a known arrangement does indeed enable the number of components to be reduced, but on the other hand it still has most of the disadvantages mentioned above.

None of the criteria for obtaining a fascia panel incorporating one or more air ducts has yet been able to be achieved, having regard in particular to the problems raised by the process of moulding hollow components of complex forms.

SUMMARY OF THE INVENTION

The basic problem of the invention was therefore to provide a method of making a fascia panel which incorporates at least one distribution duct, and in which the drawbacks mentioned above are overcome.

To this end, the invention proposes a method of making a fascia panel for a motor vehicle, of the type defined above, which includes the following operations:

(a) placing an armature in position within a mould;
(b) injection moulding a body from a foam of plastics material in the mould, using at least one removable core which is at least partly reabsorbable, and which has a selected geometry matched to that of the air duct to be incorporated;
(c) stripping the body of plastics foam from the mould;
(d) causing at least partial reabsorption of the removable core to take place; and
(e) withdrawing the reabsorbed core.

In this way, the or each air duct is, a duct of foamed plastic, constituting an integral part of the body of the fascia panel, which enables the above mentioned disadvantages to be eliminated.

The principal advantages of the invention are as follows:

the volume and overall size of the fascia panel are reduced, due to the fact that the air ducts are fully integrated within the body of the fascia panel;

there is a very wide variety of choice of form for the air ducts;

the air ducts can be deformed so as to match them to the other components of the fascia;

thermal insulation is improved, without any need to add any further insulation around the ducts, because the foamed plastics material is itself a very good insulator;

interfaces between the heating and ventilating, and/or air conditioning, apparatus and the fascia panel are eliminated, thus giving an improvement in reliability;

perfect connection can be ensured between the diffuser and the ducts;

noise deadening, both internally and externally, is improved;

aerodynamic efficiency within the fascia panel is improved;

major economies are achieved in the manufacturing prices of the components and in production costs;

the number of components is reduced; and recycling of the fascia panel is simplified, due to the reduction in the number of different materials employed.

Thus, in the fascia panel according to the invention, the or each air distribution duct is formed using a removable core which is at least partly reabsorbable and has a selected geometry, and which is present during the injection moulding of the plastics foam, the core being removed in the stripping operation.

The expression "a removable and at least partly reabsorbable core" is to be understood to mean a core which initially has a predetermined geometrical form matched to that of the air duct that is to be formed integrally in the fascia panel, and which can subsequently be reabsorbed, shrunk or reduced in size once the fascia panel has been made, so that it can be withdrawn from the moulded body. This reabsorption, shrinking, or reduction in size may be performed in three dimensions or in only two dimensions, transversely to the direction of withdrawal or extraction.

Such a core is fundamentally different from conventional mould cores or inserts, which have a set form and which are unable to be subsequently withdrawn unless the hollow forms created with their aid have walls that can be appropriately opened up.

In a preferred embodiment of the invention, step (b) includes the use of a removable core in the form of an inflatable balloon, the geometry of which is matched to that of the air duct to be formed, and step (d) comprises deflation of the inflatable balloon so that it can be subsequently withdrawn in step (e).

A retractable core of this kind can be made with very precise profiles corresponding to those of the air distribution duct or ducts to be formed. In addition, such a core can be re-used as many times as required.

The inflatable balloon is preferably made of rubber or the like, and preferably has a reinforcing armature. This reinforcing armature helps to give the balloon the required geometrical form, and also enables the balloon to be placed in position within the mould.

In another version of the invention, step (b) includes the use of a heat-shrinkable core, for example of a plastics material of the polystyrene type, the geometry of which is matched to that of the air duct to be formed, step (d) comprises heating the body of plastics foam to a moderate temperature such as to cause the heat-shrinkable core to shrink without degrading the plastics foam, and step (e) comprises withdrawing the core after it has been shrunk.

This solution is less attractive than the previous one, due to the fact that the heat-shrinkable core cannot be re-used, but must be discarded after being used once. In addition, shrinking the core makes it necessary to perform an operation of heating the fascia panel, which increases production time.

In a further embodiment of the invention, step (b) includes the use of a core of sublimable material, the geometry of which is matched to that of the air duct to be formed, while step (d) comprises heating the foam body to a moderate temperature such as to cause the material of the said core to sublime without degrading the plastics foam, and step (e) comprises removing any residues resulting from the sublimation.

Thus a core of a sublimable material is used, that is to say a core of a material which can pass directly from the solid state to the vapour state when subjected to heat. Operation (e) will then consist of merely cleaning out the residues resulting from the sublimation process.

Again, this version is less attractive than the first mentioned version, because the sublimable core is again lost after only one use, and a heating operation is necessary on the fascia panel in order to cause sublimation.

Preferably, step (b) includes the use of a thin bag enveloping the removable core, the said bag preferably remaining in place within the body of the fascia panel after the core has been removed in step (e).

In step (e), the reabsorbed core is withdrawn through an aperture in the air duct, which is preferably situated in the central region of the fascia panel.

According to a further feature of the invention, step (b) includes the use of at least two removable cores so as to form a deicing duct and a ventilating duct, which lead, respectively, to deicing and demisting vents and to ventilating vents.

In step (b), a diffuser can be embedded in the body of plastics foam, the said diffuser having an inlet which is adapted to be connected to the outlet of a heating and ventilating and/or air conditioning apparatus, at least one outlet exhausting into the ventilating duct, and an outlet exhausting into a central ventilating vent of the fascia panel.

According to a further feature of the invention, step (a) includes placing a skin in position in the base of the mould, to enable a body of plastics foam, having an outer skin, to be stripped from the mould in step (c).

According to another feature of the invention, in step (b), a foam of plastics material is used which has closed pores, for example a polyurethane foam.

In a further aspect, the invention provides a fascia panel for a motor vehicle which includes at least one integrated air duct such as is made by the above mentioned method. The said fascia panel comprises a fascia body injection moulded from a foam of plastics material, an armature embedded in the said body, and at least one air duct which is formed simultaneously with the body of the fascia panel during injection of the foam.

The or each air duct is formed using a removable core which is at least partly reabsorbable and has a selected geometry, and which is present during the injection moulding of the plastics foam, the core being removed in the stripping operation.

The air distribution duct is preferably lined internally with a thin bag or envelope. This bag, which is interposed during the moulding operation between the core and the plastics foam, prevents the foam from adhering on the core, and thus facilitates the subsequent withdrawal of the core. It is in fact advantageous to leave the bag in the duct in the finished component.

Preferably, the air duct has a central aperture adapted to be connected to the outlet of a heating and ventilating, and/or air conditioning, apparatus. This central aperture thus enables the core to be easily withdrawn.

In a preferred embodiment of the invention, the fascia panel includes a deicing duct and a ventilating duct, leading to deicing and demisting vents and to ventilating vents respectively.

Although the two ducts may be connected directly to the outlet of the heating and ventilating and/or air conditioning apparatus, the invention preferably provides a central diffuser embedded in the body of plastics foam, the said diffuser having an inlet adapted to be connected to the outlet of a heating and ventilating, and/or air conditioning, apparatus, at least one outlet exhausting into the ventilating duct, and an outlet exhausting into a central ventilator of the fascia panel.

Preferably, the armature of the fascia panel is an armature of open structure at least partly surrounding the air duct.

The said body is preferably formed of a foam of plastics material having closed pores, for example a polyurethane foam, and is provided with an outer skin.

BRIEF DESCRIPTION OF THE DRAWINGS

In the following description, which is given by way of example only, reference is made to the accompanying drawings, in which:

FIG. 1 is an exploded perspective view of a fascia panel with integrated air ducts in accordance with the invention;

FIG. 2, which is on a larger scale, is a view in cross section taken on the line II—II in FIG. 1;

DESCRIPTION OF THE PREFERRED EMBODIMENT

Figure 3:
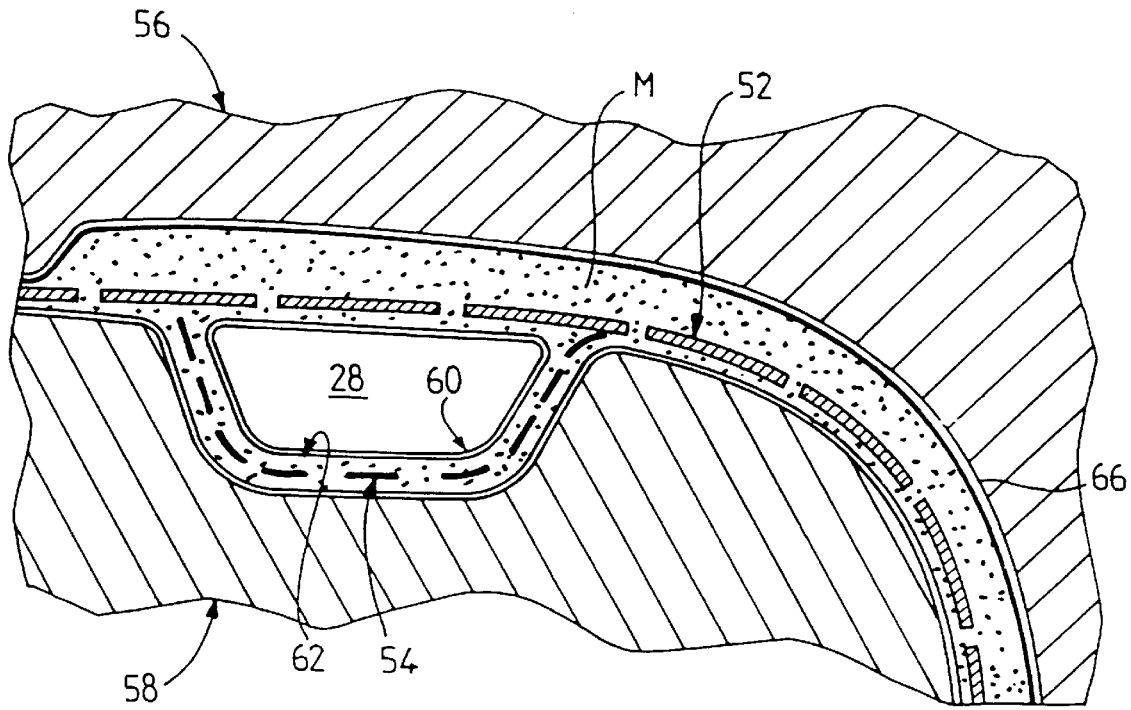
FIG. 3 is a view in cross section on an enlarged scale, showing part of a fascia panel in the course of manufacture using a core of the inflatable and deflatable balloon type.

The fascia panel shown in FIG. 1 comprises a body 10 which is formed by moulding, and which has an upper part 12 extended by a visor-like portion 14 situated on the left hand side of the fascia panel. The body 10 also has a front portion 16 which defines a housing 18 situated below the visor-like portion 14, for receiving a control panel (not shown), a central housing 20, and two side housings 22.

In addition, the upper part 12 of the fascia panel is formed with two oblong apertures 24, also referred to as "ears", which are so situated as to lie close to the windscreen (not shown) of the vehicle. The body 10 also has two side apertures 26 of generally circular form (only one of which can be seen in FIG. 1), which are arranged to exhaust respectively close to the right and left hand front doors (not shown) of the vehicle.

During manufacture of the fascia body 10, two air ducts are formed integrally by moulding, namely a deicing duct 28 and a ventilating duct 30 (FIGS. 1 and 2), both of which extend over nearly the whole transverse width of the fascia panel.

The deicing duct 28 is in communication with the apertures 24 and also with the apertures 26. The apertures 24 are arranged to receive, subsequently, vent members 32 for the purpose of deicing and demisting the windscreen. The purpose of the apertures 26 is to feed deicing or demisting vents (not shown) which are incorporated in the front doors of the vehicle for the purpose of deicing and demisting the side windows.

The deicing duct 28 has a central aperture 34 which is arranged to be supplied with air that has been treated by a heating and ventilating, and/or air conditioning, apparatus AC, indicated diagrammatically in FIG. 1.

The ventilating duct 30 has a central aperture 36 which lies close to the central aperture 34 of the deicing duct 28.

The central aperture 36 contains part of a diffuser 38 which is formed by moulding in a plastics material. This diffuser has an inlet 40 which is arranged to be connected to the outlet of the apparatus AC, two side outlets 42 which are arranged to exhaust on the right and left hand sides of the ventilating duct 30, and a front outlet 44 which is adapted to be fitted in the central housing 20 of the fascia panel. The diffuser 38 also has fastening lugs 46.

At its two ends, the ventilating duct 30 is in communication with the front side housings 22, in which a pair of side ventilating vent members 48 are subsequently fitted.

Thus, the diffuser 38 and the ventilating duct 30 enable processed air to be delivered to the side vents 48 and towards the front outlet 44, in which a central ventilating vent member 50 is arranged to be fitted.

In another version, the central aperture 34 of the deicing duct 28 could be connected to the outlet of the apparatus AC through a diffuser (not shown), which has an air inlet and two side air outlets. In a further version, the diffuser 38 may be omitted, with the central aperture 36 of the ventilating duct 30 being connected directly to the outlet of the apparatus AC.

As can best be seen in FIG. 2, the body 10 of the fascia panel incorporates an armature 52 having an open structure, which may for example consist of a grille of metallic or plastics material. This armature 52 has a configuration which is matched to that of the fascia body, and it may surround, at least partly, each of the ducts 28 and 30. FIG. 2 shows that the ducts 28 and 30, made in accordance with the invention, are very much smaller than the corresponding ducts 28' and 30' made in accordance with the prior art.

Two embodiments of the method of making the fascia panel will now be described with reference to FIGS. 3 and 4.

In the version shown in FIG. 3, a body 10 is formed by moulding, by injecting a polyurethane foam M around an armature 52 with an open structure, similar to that described above, and between a skin 66 which has been pre-formed in accordance with the external profile of the fascia panel. The armature 52 includes an armature portion 54 which defines an internal space to constitute an air duct, which in this example constitutes a deicing duct 28 having a transverse cross section which is substantially that of a trapezium.

The body 10 is formed by injection moulding the foam M in a mould consisting of two mould parts 56 and 58, using a removable core 60, which is at least partly reabsorbable, for forming the duct 28.

In this example, the removable core 60 is an inflatable balloon, of preselected form matched to that of the deicing duct 28. This inflatable core 60 is made of rubber or a similar material, and includes an armature which is for example of a textile material, and which is adapted to give the core the desired shape. The core is placed in position in the mould, and more precisely between the armature 52 and the armature portion 54, and is then inflated to give it the required shape.

In order to form the deicing duct 28 of FIG. 1, use may be made of either a single balloon introduced through the central aperture 34 and having two ends which extend up to the side apertures 26, or else two balloons which are introduced through the aperture 34, with each of these balloons having an end which extends up to a side aperture 26.

The balloon, or each balloon, is enveloped with a thin bag or envelope 62, for example of polyethylene (FIG. 3). Each of these inflatable balloons has a valve (not shown) through which it can be inflated or deflated.

After the skin 66, which may for example be thermoformed, has been placed in position in the base of the mould 56, 58, and after the armature 52 and the core 60 have been placed in position in the mould 56, 58, the chemical constituents required for formation of the foam, in particular a polyisocyanate for forming polyurethane, are injected into the mould. The chemical reaction is then allowed to take place until the foam has solidified.

The body 10 is subsequently stripped from the mould by separating the parts 56 and 58 of the mould.

The balloon 60 (or each balloon) constituting the core 60 can then be deflated. The bag 62, which preferably remains in place within the body 10, facilitates this deflation, and also facilitates the subsequent removal of the balloon 60, by forming a barrier against adhesion between the core 60 and the foam of plastics material.

This bag 62 has another advantage in that it acts as an internal lining and seal for the deicing duct 28 (and also for the duct 30), and removes the necessity to scavenge escaped foam particles.

Thus, once the foam has set, the or each core 60 defining the deicing duct 28 is deflated, and the balloon or balloons, thus deflated, are removed through the central aperture 34. The ventilating duct 30 is formed in the same way, with the balloon or balloons being removed through the central aperture 36.

Figure 4:
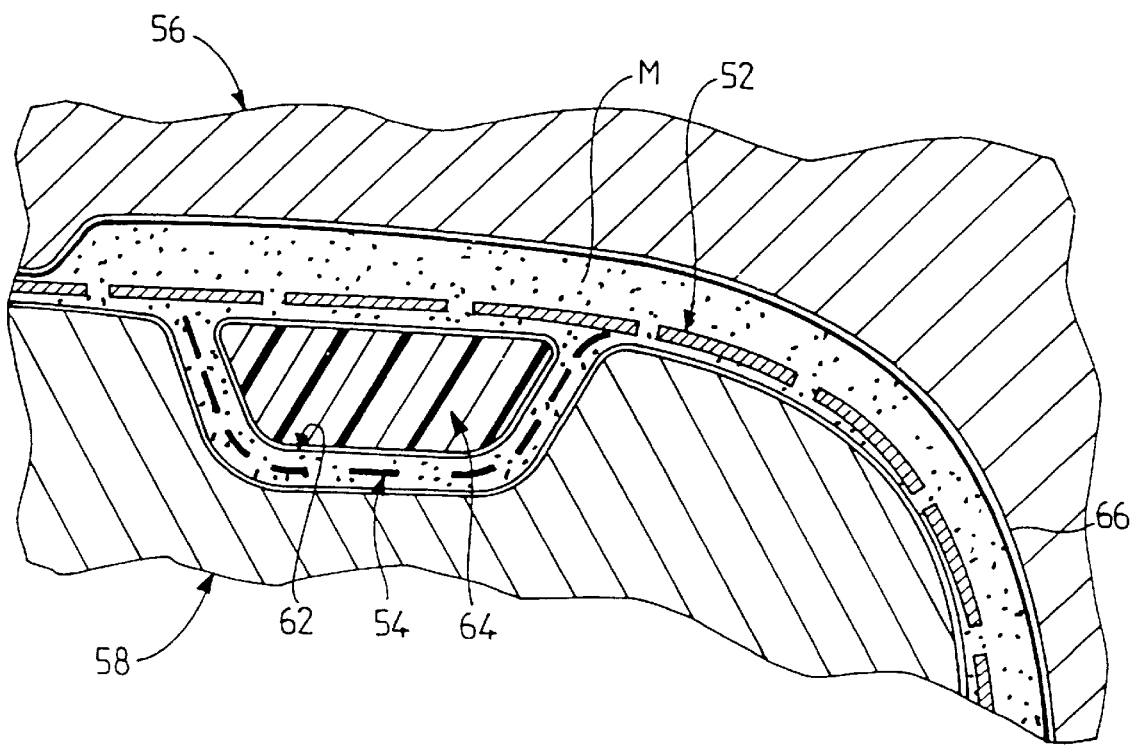
FIG. 4 is a view similar to that in FIG. 3, in another embodiment, in which the core is heat-shrinkable or sublimable.

In the embodiment of FIG. 4, to which reference is now made, a removable core 64 is used, which in this example is a heat shrinkable core which may for example be made of polystyrene.

As before, either a single core 64, or two separate cores, can be used in forming the deicing duct 28. Here again, a bag 62, similar to that described above, may be interposed between the core and the foam of plastics material, so as to prevent, in particular, adherence of the latter on the core.

As in the embodiment described above, the fascia body 10 is made using the two-part mould 56 and 58, but in this case the heat-shrinkable core 64 is placed in position instead of the inflatable balloon 60.

After being stripped, the fascia body 10, which still contains the heat shrinkable core or cores 64, is placed into an appropriate oven, and is brought to a temperature sufficiently high to cause the core 64 to shrink under heat, but not high enough to degrade the foam M. By way of example, this temperature is generally of the order of 80° C.

Under the influence of the temperature, the heat shrinkable core 64 contracts by quite a large amount, which enables it to be then removed through the central aperture 34 of the duct 28. However, and by contrast with the previous embodiment, the heat shrinkable core 64 cannot be re-used.

In a modified version of the method of FIG. 4, the core 64 may be formed of a material capable of subliming, that is to say a material which can pass from the solid state to the vapour state under the action of heat.

The method is generally the same as that described above, and, after being stripped, the fascia body 10, which still encloses the sublimable core 64, is placed in an appropriate oven, in which the whole is brought to a temperature sufficient to cause at least partial sublimation of the core 64, but insufficient to degrade the foam. Under the action of the temperature, the sublimable core sublimes at least partially, to enable the residues from this operation to be subsequently removed.

In the embodiment illustrated in FIG. 4, one or more further integral ducts can also be made, and in particular a ventilating duct 30 such as that shown in FIGS. 1 and 2.

In this way, the invention enables a fascia panel to be obtained which comprises a monobloc body incorporating one or more air ducts for carrying processed air from the apparatus AC to the various air outlet vents arranged in the fascia panel.

The invention is of course not limited to the embodiments described above by way of example.

Thus, other modified versions may be provided, especially as regards the removable and reabsorbable core.

In addition, as already mentioned, the or each ventilating duct may be fed, either directly by the apparatus AC, or indirectly through at least one diffuser, which is preferably of a suitable plastics material, and which is fitted in position during the operation of moulding the foam of plastics material.

What is claimed is:

1. A method of making a fascia panel incorporating at least one integral air duct, comprising the steps of:
   (a) positioning an armature within a cavity formed in a mold;
   (b) introducing an injection molding plastic material in the mold cavity to form a fascia panel foam body, using at least one removable core which is at least partly reabsorbable, the core having a configuration selected to match that of the air duct to be incorporated;
   (c) removing the fascia panel foam body from the mold;
   (d) causing the removable core to be at least partially reabsorbed; and
   (e) withdrawing the reabsorbed core from the fascia panel foam body.

2. A method according to claim 1, wherein step (b) includes the use of a removable core in the form of an inflatable balloon having a configuration selected to match that of the air duct to be formed, and in that step (d) comprises deflation of the inflatable balloon so that it can be subsequently withdrawn in step (e).

3. A method according to claim 2, wherein the inflatable balloon is made of rubber material, and has a reinforcing armature.

4. A method according to claim 1, wherein step (b) the core comprises a heat-shrinkable material and is configured to match the shape of the air duct to be formed, in that step (d) comprises heating the facia panel foam body so as to cause the heat-shrinkable core to shrink without degrading the fascia panel foam body, and wherein step (e) comprises withdrawing the core after it has been shrunk.

5. A method according to claim 1, wherein step (b) the core comprises a sublimable material and is configured to match the shape of the air duct to be formed, step (d) comprises heating the fascia panel foam body so as to cause the material of the core to sublime without degrading the fascia panel foam body, and step (e) comprises removing any residues resulting from the sublimation.

6. A method according to claim 1, wherein step (b) includes the use of a thin bag enveloping the removable core, the bag remaining in place within the the fascia panel foam body after the core has been removed in step (e).

7. A method according to claim 1, wherein in step (e), the reabsorbed core is withdrawn through an aperture in the air duct.

8. A method according to claim 1, wherein step (b) includes the use of at least two removable cores so as to form a deicing duct and a ventilating duct, wherein the deicing duct is in coupled in fluid communication with deicing and demisting vents and the ventilating duct is coupled in fluid communication with ventilating vents.

9. A method according to claim 8, wherein in step (b), a diffuser is embedded in the fascia panel foam body, said diffuser having an inlet which is adapted to be connected to the outlet of a heating and ventilating and/or air conditioning apparatus, at least one outlet exhausting into the ventilating duct, and an outlet exhausting into a central ventilating vent of the fascia panel.

10. A method according to claim 1, wherein step (a) includes placing a skin in position on the base of the mold, to enable the facia panel foam body to be removed from the mold in step (c).

11. A method according to claim 1, wherein in step (b), the fascia panel foam body has closed pores.

12. A fascia panel for a motor vehicle made by the method of claim 1, the fascia panel comprising a plastic foam body, an armature embedded in the foam body, and at least one integral air duct formed by the foam body of the fascia panel.

13. A fascia panel according to claim 12, wherein the air duct is lined internally with a thin bag.

14. A fascia panel according to claim 12, wherein the air duct has a central aperture adapted to be connected to the outlet of a heating and ventilating, and/or air conditioning apparatus.

15. A fascia panel according to claim 12, comprising a deicing duct and a ventilating duct, wherein the deicing duct is coupled in fluid communication with deicing and demisting vents and the ventilating duct is coupled in fluid communication with the ventilating vents.

16. A fascia panel according to claim 15, comprising a central diffuser embedded in the foam body, the diffuser having an inlet adapted to be connected to the outlet of a heating and ventilating, and/or air conditioning apparatus, at least one outlet exhausting into the ventilating duct, and an outlet exhausting into a central ventilator of the fascia panel.

17. A fascia panel according to claims 12, wherein the armature is an armature of open structure surrounding the air duct at least partly.

18. A fascia panel according to claim 12, wherein the foam body has closed pores, and is provided with an outer skin.

19. A method of making a fascia panel having at least one integral air duct, comprising the steps of:
(a) positioning an armature within a cavity formed in a mold;
(b) enveloping a removable and at least partly reabsorbable core within a thin bag, the core having a configuration selected to match the desired shape of the integral air duct;
(c) positioning at least one core within a mold cavity;
(d) introducing an injection molding plastic material into the mold cavity to form a fascia panel foam body;
(e) removing the fascia panel foam body from the mold;
(f) causing the core to be as least partially reabsorbed; and
(g) removing the reabsorbed core from the fascia panel foam body, and maintaining the bag within the fascia panel foam body after the core has been removed.

20. A method of making a fascia panel having at least two integral air ducts, comprising the steps of:
(a) positioning an armature within a mold cavity;
(b) positioning at least two removable and at least partly reabsorbable cores within the mold cavity, wherein a first removable core is configured to form a deicing duct and a second removable core is configured to form a ventilating duct;
(c) introducing an injection molding plastic material into the mold cavity to form a fascia panel foam body;
(d) embedding a diffuser in the fascia panel foam body, the diffuser having an inlet which is adapted to be connected to the outlet of a heating and ventilating and/or air conditioning apparatus, at least one outlet exhausting into the ventilating duct, and an outer exhausting into a central ventilating vent of the fascia panel;
(e) removing the fascia panel foam body from the mold;
(f) causing the core to be as least partially reabsorbed; and
(g) removing the reabsorbed core from the fascia panel foam body.

21. A fascia panel for a motor vehicle having at least one integral air duct produced according to a method comprising the steps of:
(a) positioning an armature within a cavity formed in a mold;
(b) enveloping a removable and at least partly reabsorbable core within a thin bag, the core having a configuration selected to match the desired shape of the integral air duct;
(c) positioning at least one core within a mold cavity;
(d) introducing injection molding plastic material into the mold cavity to form a fascia panel foam body;
(e) removing the fascia panel foam body from the mold;
(f) causing the core to be as least partially reabsorbed; and
(g) removing the reabsorbed core from the fascia panel foam body, and maintaining the bag within the fascia panel foam body after the core has been removed.

22. A fascia panel for a motor vehicle having at least one integral air duct produced according to a method comprising the steps of:
(a) positioning an armature within a mold cavity;
(b) positioning at least two removable and at least partly reabsorbable cores within the mold cavity, wherein a first removable core is configured to form a deicing duct and a second removable core is configured to form a ventilating duct;
(c) introducing an injection molding plastic material into the mold cavity to form a fascia panel foam body;
(d) embedding a diffuser in the fascia panel foam body, the diffuser having an inlet which is adapted to be connected to the outlet of a heating and ventilating and/or air conditioning apparatus, at least one outlet exhausting into the ventilating duct, and an outer exhausting into a central ventilating vent of the fascia panel;
(e) removing the fascia panel foam body from the mold;
(f) causing the core to be as least partially reabsorbed; and
(g) removing the reabsorbed core from the fascia panel foam body.

* * * * *